July 5, 1966  R. T. INNIS ET AL  3,259,719
CURRENT LIMITING INDICATING FUSE HAVING SHEARING
FORCES ON THE STRAIN ELEMENT
Filed Oct. 10, 1963

WITNESSES
Theodore F. Wrobel
James F. Young

INVENTORS
Robert T. Innis
George A. Rusnak
BY Maury L. Hull
ATTORNEY

United States Patent Office 3,259,719
Patented July 5, 1966

3,259,719
CURRENT LIMITING INDICATING FUSE HAVING SHEARING FORCES ON THE STRAIN ELEMENT
Robert T. Innis, Elletsville, and George A. Rusnak, Bloomington, Ind., assignors to Westinghouse Electric Corporation, Pittsburgh, Pa., a corporation of Pennsylvania
Filed Oct. 10, 1963, Ser. No. 315,305
9 Claims. (Cl. 200—120)

This invention relates to improvements in fuses, and more particularly to an improved current limiting fuse especially suitable for use in series with a capacitor.

In recent years, in electrical systems, the use of capacitor units for phase correction has become more and more commonplace. Capacitors are usually mounted in banks, and have any convenient or desired KVAR ratings. It is very desirable to have a current limiting fuse in series with each capacitor to prevent case rupture in the event of breakdown and to prevent damage to the entire capacitor bank. Preferably, the fuse should be capable of disconnecting itself from the circuit thereby eliminating tracking, which can cause oscillatory current which can damage other capacitors in the bank.

In one well known type of capacitor bank construction, an indicating fuse is mounted on the aluminum bus above each capacitor unit. Connection to the capacitor units is made by a flexible pigtail. The pigtail is passed through a coil spring fuse element ejector and indicator mounted on the capacitor unit terminal. The spring is held in a curved position when the fuse is intact. When the fuse blows the spring moves to a horizontal position, pulling the pigtail or fuse link from the fuse holder. Normally the strain link or prior art fuses, that is, the link which resists the force of the coiled spring, is in tension, requiring that the link be firmly anchored at one end to a conductor rod, and be anchored at the other end to the pigtail of the fuse. This is difficult to do, and also limits the current carrying capacity of the fuse, requires a fuse tube or housing which must be some inches longer than it otherwise would necessarily be, and also requires complicated parts to accomplish the necessary mechanical results while providing the electrical circuit arrangement of the fuse.

Our invention overcomes these and other disadvantages of the prior art described and of several prior art patents. In summary, our invention includes but is not limited to a fuse of the type in which a fuse wire is disposed in a spiral groove around an interrupter rod, and is electrically connected at one end of the fuse to a movable connector having a pigtail. In our invention, a strain link is wrapped around one end of the interrupter rod, which is composed of steatite or other suitable material, and passes through an aperture through the interrupter rod and a transverse bore through the connector, whereby shear forces are exerted on the strain wire, and there is no substantial tension or force on the soldering of the strain wire. The strain wire must be sheared before the pigtail can be ejected by spring force. The result of these and other features of our invention is that of the current carrying ability of the fuse is doubled, the fuse is approximately 4 inches shorter in length, has fewer parts, and the cost of the material is less than the previously described prior art fuse and other similar fuses.

Accordingly, a primary object of our invention is to provide a new and improved current limiting fuse.

Another object is to provide a new and improved current limiting fuse especially suitable for use in a capacitor bank for giving a visual indication of when the fuse has blown and for disconnecting the associated capacitor from the electrical circuit.

These and other objects will become more clearly apparent after a study of the following specification when read in connection with the accompanying drawings, in which.

Figure 1:
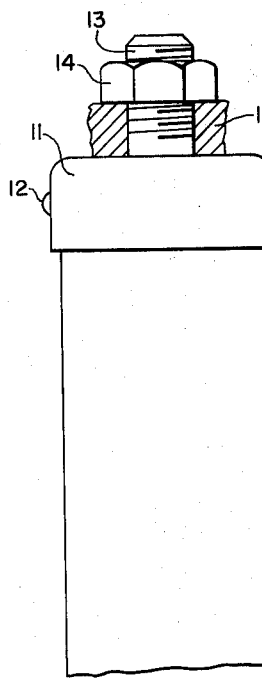
FIGURE 1 is a side elevational view partially broken away, or a general assembly view, of a fuse constructed according to our invention.

Reference is made now to the drawings for a more detailed understanding of the invention, and in particular to FIG. 1 thereof. A hollow tube 10 composed of suitable insulating material has a cap 11 of conductive material, for example metal, secured thereto by bolts or rivets 12 spaced around the periphery thereof, the metal cap 11 having an extended connector portion 13 which may may be threaded for threaded engagement with a nut 14. It will be understood that the nut 14 and portion 13 are adapted to make electrical connection with a bus 15 or other electrical connector.

Figure 2:
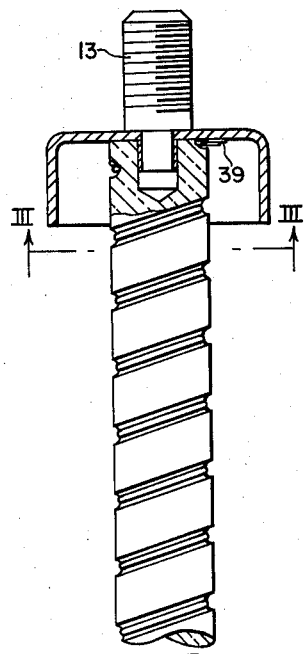
FIG. 2 is a view of the interrupter rod and associated parts, or an element assembly view.
Figure 4:
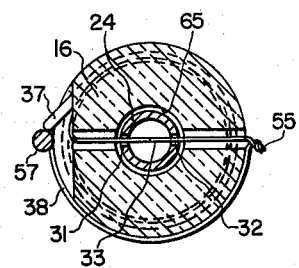
FIG. 4 is a cross-sectional view through the lines IV—IV of FIG. 2.

Substantially centrally disposed in the tube 10 and extending axially thereof is an interrupter rod 16 composed of steatite or other suitable material and having a spiral groove 18 extending the length thereof, the reasons for which will become more clearly apparent hereinafter. The space or volume inside the tube 10 between the wall of the tube and the rod 16 is filled with a suitable material 17, such for example as white sand. The helical groove 18 has a main fuse wire 37 disposed therein and running the length of the groove. It will be understood that wire 37 may be a single wire or several strands twisted together, depending upon the desired current carrying capacity. The lower end of rod 16 as seen in FIG. 1, which end is designated 21, abuts against a spacer 22, the spacer 22 being washer-shaped as seen in FIG. 2 and having passing through the central aperture 23 thereof a connecting member 24. The rod 16 is held firmly in position in the tube 10 by a cylindrical-shaped retaining member 27 having an annular shoulder groove 28 therein to fit snugly against the spacer 22, the retaining member 27 being held in place as by drive screws 29, FIG. 1. As seen in FIG. 4, the connecting member 24 is a hollow tube or conductor and is composed of any suitable material, such as copper, having at predetermined positions therein a pair of oppositely disposed small tranverse bores 31 and 32, through which passes a portion 33 of the strain link 38. Strain link 38 including portion 33 may be a wire alloy containing 60% nickel, 24% iron, 16% chromium, 0.1% carbon, or an alloy containing 80% nickel and 20% chromium, or other suitable material. The lower end of the cylindrical conductive member 24 as seen in FIG. 2 has a pigtail of flexible material 35 soldered or otherwise secured therein.

Figure 5:
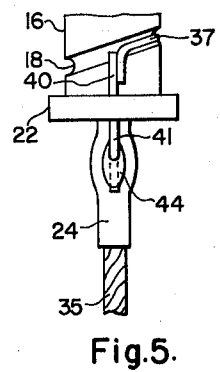
FIG. 5 is a detailed view of one soldered connection of the apparatus.

As aforementioned it is seen that the main fuse wire 37 is disposed in the groove 18; this wire may be composed of, for example, silver, and constitutes the main fuse element. The wire 37 is firmly anchored at 39, as by soldering, FIG. 3. The lower end of the main fuse wire element 37 as seen in FIG. 2, and as seen in detail in FIG. 5, is soldered at 40 to low temperature or meltable fuse element 41. Element or portion 41 melts at a predetermined current value. This fuse element 41 passes through a recess 42 in the end of the rod 16, FIG. 2, passes through the aperture 23 in spacer 22, and is soldered by soldered connection 44 to the aforementioned hollow connector 24. As will be seen more fully hereinafter, the fusible wire 41 is adapted to melt at a relatively low current of, for example, 120 to 200 amperes for one fuse rating, and this shunts the main current path through the upper portion of the connector 24 and through the alloy wire portion 33, resulting in the vaporizing of the alloy wire 33. When the alloy wire 33 vaporizes, it releases the hollow conductor 24 and the action of a compressed coiled spring 51, FIG. 1, pressing against a washer 52 and a push nut 53 secured to connector member 24, forces the connector 24 outwardly, completely breaking the electrical circuit and also giving a visual indication that the fuse has blown.

Particular reference is made now to FIG. 4, where it is seen that the strain link or wire 38 is wrapped one and ½ turns around rod 16 and the ends twisted together three full turns at 55, then the excess ends are cut off. Strain wire 38 is soldered to the main fuse wire 37 at the soldered connection 57.

Figure 3:
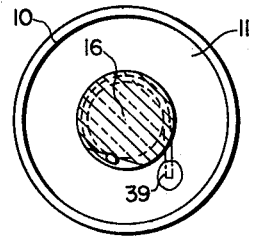
FIG. 3 is a cross-section through the lines III—III of FIG. 2.

Particular reference is made now to FIG. 3, a cross-section through the lines III—III of FIG. 2. The fuse or wire fuse element 37 is firmly soldered or otherwise connected to the metal cap 11 at soldered connection 39 aforementioned.

In understanding the operation of the aforedescribed apparatus, it should be recalled that one of the purposes of the invention is to provide a new and improved fuse for use in series with a capacitor of a capacitor bank, the fuse to provide a visual indication of when the fuse had blown, the fuse to blow both on small overcurrents and large overcurrents, and the fuse to provide an open circuit which would prevent tracking or the formation of a relatively high impedance conductive path through the blown capacitor through which other capacitors of the bank might discharge in an oscillatory fashion and to limit the high discharge current from adjacent capacitors or available line current. To this end, two parallel current paths are provided between pigtail 35 and main fuse wire 37 connected to bus 15 at the opposite end of the fuse. One of these paths is by way of connector 24, fusible element 41 to main fuse wire 37, whereas the other current path is by way of connector 24 and alloy strain wire 38 including that portion 33 of the strain wire 38 which passes through small holes or bores in the hollow connector 24, normally preventing the connector from being withdrawn from the fuse. The first-named path is of relatively low resistance compared to that of the second-named path, and normally carries almost all or the major portion of the current through the fuse.

Assuming that an overcurrent of a relatively small value occurs, then the fuse wire 37 heats up together with the fusible element 41 and at a predetermined temperature the element or portion 41 melts. This shunts the main current path through connector 24 and through the portions of the alloy wire 33 which make connection with the connector 24 as it rests in the bore or aperture 65 in the end of the rod 16. By suitable choice of wire size a current of 120 amperes, for example, is made more than sufficient to immediately vaporize the alloy wire portion 33, and this releases the connector 24 so that the force of the coiled compressed spring 51 pressing against the washer 22 and against the washer 52 forces the washer 52 outwardly carrying the push nut 53 and connector 24 with it, completely ejecting the connector 24 from the end of the tube or fuse so that it may dangle free from the flexible lead or pigtail connection 35, giving a visual indication that the fuse has blown.

Assume now by way of example that a very large overcurrent occurs. At very high overcurrents the wire 37 on the rod 16 melts as well as the element 41. The melting of the wire 37 causes a high arc inside the tube 10 and this burns or cleans substantially everything out of the fuse itself.

For low current operation, the size of the alloy wire is coordinated with the size of the silver wire, suitable choice or wire sizes being made. In practice the alloy wire is sufficiently strong so that the spring 51 will not cause rupture of the alloy wire and ejection of the connector 24 and pigtail 35. It has been found in practice in one typical fuse embodying the invention that the pigtail will withstand a pull of about 80 pounds without rupturing the alloy wire.

An important feature of the invention is the use of a grooved interrupter rod. By putting the fusible element or the main current carrying wire in the groove 38, the turns spacing of the wire can be closer than would be otherwise permissible. The groove forms a shadow so that flashover cannot occur from turn to turn at the same potential difference which would cause flashover were no groove employed. Whereas many shapes of grooves are of possible value, it has been found that the spiral groove shown is satisfactory.

We have discovered also that only certain insulating materials are suitable for use in the interrupter rod 16. If on high current blowing the portions of the interrupter rod adjacent the groove get too hot, it is difficult for the fuse to clear. One material tried was limestone, but it was found that the limestone contained too much water, which when vaporized fractured the sand formations and formed a conductive path. It was found also that ordinary porcelain was unsuitable for use in the interrupter rod because the groove got so hot it formed a conductive path. The material of the interrupter rod must have two important characteristics: (1) the rod must not break upon heat shock formed by a sudden complete melting of the wires upon a large overcurrent, and (2) the material must not have a high surface conductivity when it gets hot. We have discovered that a steatite material meets both the requirements of low surface conductivity at high temperatures and a high shatter resistance to heat shock.

In summary, one important feature of our invention is that the strain wire or strain link is in shear instead of in stress as in prior art fuses. By putting the main current carrying wire in a groove, we have been able to shorten the length of the fuse while providing improved electrical characteristics. Our fuse is characterized by simplicity of construction, and may be built at a reduced cost because of the few number of parts which are employed when compared to prior art fuses offering the same or substantially the same electrical characteristics.

The end of the interrupter rod 16 adjacent the coil spring and associated parts may be of reduced diameter if desired.

Whereas we have shown and described our invention with respect to an embodiment thereof which gives satisfactory results, it should be understood that changes may be made and equivalents substituted without departing from the spirit and scope of the invention.

We claim as our invention:

1. A fuse comprising, in combination, a casing of insulating material, an electrical terminal at one end of the casing, an interrupter rod of insulating material extending substantially the length of the casing substantially centrally thereof, the interrupter rod having a groove along the length thereof, said groove having a first conductor disposed therein connected to the electrical terminal at one end of the rod, the space between the interrupter rod and the casing being filled with sand, a spacer member disposed at the other end of the interrupter rod, said spacer member having an aperture centrally disposed therein for receiving the end of the rod, retaining means mounted in the casing adjacent the spacer member for holding the interrupter rod in position in the casing, the adjacent end of the interrupter rod having an axial aperture centrally disposed therein, a movable conductive connector extending into the casing and into the aperture in the adjacent end of the interrupter rod, washer means secured to the movable connector, a normally tensioned spring exerting pressure between the spacer member and the washer means and tending to force the washer means and connector out of the end of the casing, the connector having a transverse bore passing therethrough near the inner end thereof, a fusible element connecting said first conductor to the connector, the fusible element being adapted to melt when at least a predetermined current passes therethrough, a second conductor passing through the bore in the connector and normally holding the connector in position in the aperture in the interrupter rod, the portion of the second conductor which holds the connector in place having shear forces exerted thereon by the spring while the connector is in place, the second conductor being electrically connected to the first conductor, the melting of the fusible element causing the entire fuse current to flow through the second conductor, the second conductor being adapted to be vaporized in the area of the connector by a current not greater than said predetermined current and to release the connector whereupon the spring forces the washer means and connector out of the end of the casing to give a visual indication that the fuse has blown.

2. A fuse according to claim 1 wherein the interrupter rod is additionally characterized as being composed of a steatite material selected to have a low surface conductivity at high temperatures and a high shatter resistance to heat shock.

3. A fuse according to claim 1 wherein the second conductor is additionally characterized as being an alloy wire containing nickel and chromium in predetermined proportions.

4. A fuse according to claim 1 wherein the groove in the interrupter rod is additionally characterized as being sufficiently deep to prevent flashover between conductor turns at the maximum voltage to which the fuse is to be subjected.

5. Fuse apparatus comprising, in combination, a casing composed of insulating material, an interrupter rod extending substantially the length of the casing, an electrical terminal at one end of the casing, a first conductor mounted on the interrupter rod and making electrical connection with the electrical terminal, a movable connector mounted in the other end of the casing, a spacer member disposed in the other end of the casing adjacent the end of the connector rod, retaining means for the spacer member, a washer secured to the movable connector, a normally tensioned spring disposed between the washer and the spacer member and exerting force in a manner which tends to move the connector out of the adjacent end of the casing, a fusible element connecting the connector to the first conductor, the fusible element being adapted to melt when at least a predetermined current flows therethrough, a second conductor having a current carrying capacity substantially less than that of the first conductor electrically connecting the first conductor to the movable connector, the interrupter rod having an axial aperture extending into one end thereof and oppositely disposed transverse apertures through the wall of the rod into the axial aperture, the connector normally extending into said axial aperture and having an aperture therein in alignment with the transverse apertures in the interrupter rod, the second conductor passing through the transverse apertures in the interrupter rod and through the aperture in the connector and normally retaining the connector in place, the coiled spring normally exerting shear forces on the second conductor, the passage of current through the second conductor when the fusible element in series with the first conductor melts causing the second conductor to melt and release the movable connector whereupon the spring forces the movable connector out of the adjacent end of the casing.

6. Fuse apparatus according to claim 5 additionally characterized in that the interrupter rod has a spiral groove extending the length thereof, the first conductor being disposed in the spiral groove.

7. In fuse apparatus, in combination, a cylindrical casing composed of insulating material, electrical terminal means disposed at one end of the casing, an interrupter rod composed of insulating material extending through the casing, a fuse wire mounted on the interrupter rod and electrically connected to said terminal means at one end of the interrupter rod, said interrupter rod having an axial bore in the other end thereof, said bore extending a predetermined distance into the interrupter rod, a movable connector element releasably disposed in said axial bore, the interrupter rod and the movable connector element both having transverse bores therethrough, said transverse bores being aligned while the connector element is in normal position in the axial bore, a strain wire passing through the transverse bores in the interrupter rod and the connector element and forming an electrical connection between the fuse wire and the connector element, means associated with the connector element for moving the connector element when the connector element is released, said last-named means including spring means normally applying shear forces to the strain wire, and a low temperature meltable fuse element connected to provide a parallel current path between the connector element and the fuse wire, the strain wire being of predetermined current carrying capacity whereby the passage of at least a predetermined current therethrough causes the strain wire to melt resulting in the release of the movable connector element.

8. Fuse apparatus according to claim 7 including in addition a spacer fixed to the interrupter rod abutting against one end of the spring means, and securing means connected to the movable connector element and abutting against the other end of the spring means.

9. Fuse apparatus according to claim 7 in which the interrupter rod is additionally characterized as having a spiral groove therein, said fuse wire being disposed in said groove.

References Cited by the Examiner

UNITED STATES PATENTS

| | | | |
|---|---|---|---|
| 1,299,387 | 4/1919 | Schweitzer et al. | 200—117 |
| 2,111,745 | 3/1938 | Boothe | 200—117 |
| 2,143,038 | 1/1939 | Smith | 200—120 |
| 2,246,193 | 6/1941 | Smith | 200—117 |
| 2,416,428 | 2/1947 | Boothe | 200—135 |
| 2,523,139 | 9/1950 | Owens | 200—120 |

FOREIGN PATENTS 644,526  5/1937  Germany.

BERNARD A. GILHEANY, *Primary Examiner.*